July 12, 1960 C. C. LITTELL, JR 2,944,540
OVEN
Filed Dec. 22, 1955

INVENTOR.
CHARLES C. LITTELL JR.
BY
HIS ATTORNEYS 2,944,540
Patented July 12, 1960

2,944,540

OVEN

Charles C. Littell, Jr., 434 Patterson Road, Dayton 19, Ohio

Filed Dec. 22, 1955, Ser. No. 554,818

5 Claims. (Cl. 126—273)

This invention relates to an oven chamber, and more particularly to improvements in the mechanical design of the oven chamber, although not necessarily so limited.

In the conventional household or industrial heating oven, a door is provided on one vertical wall of the oven chamber for permitting access to the interior of the oven. In some respects, it is a disadvantage to have the door opening so located, primarily for the reason that each time the door is opened, hot air escapes from the oven and relatively cool room air enters the oven. The net effect is that the oven temperature is lowered each time the door is opened. In industrial operations, where the door to an oven may be opened frequently to inspect or change the contents of the oven, and in household applications where the door may be opened merely for basting, and so on, the heat losses resulting may increase the baking or curing time appreciably.

To avoid this difficulty, it is an object of this inventon to provide an oven wheren the opening to the oven is placed in the bottom of the oven.

Another object of this invention is the provision of an oven having support racks movable with the door, so that as the oven door is drawn downwardly to open the oven, the support racks within the oven are also drawn downwardly out of the oven.

A further object of this invention is the provision of motor means for automatically opening and closing the oven door and automatically lowering material from the oven.

Still another object of this invention is to provide an oven unit which, for household use, may be installed and mounted adjacent other cabinets and thus blend harmoniously in a room.

Another important object of this invention is the provision of ducts for conducting away any air displaced from the oven through heating, the ducts being situated at the bottom of the oven chamber, so that only the coolest air is displaced from the oven, this air being conducted along the sides of the oven so as to reduce heat losses through the walls of the oven.

Other objects and advantages reside in the construction of parts, the combination thereof and the mode of operation, as will become more apparent from the following description.

Figure 1:
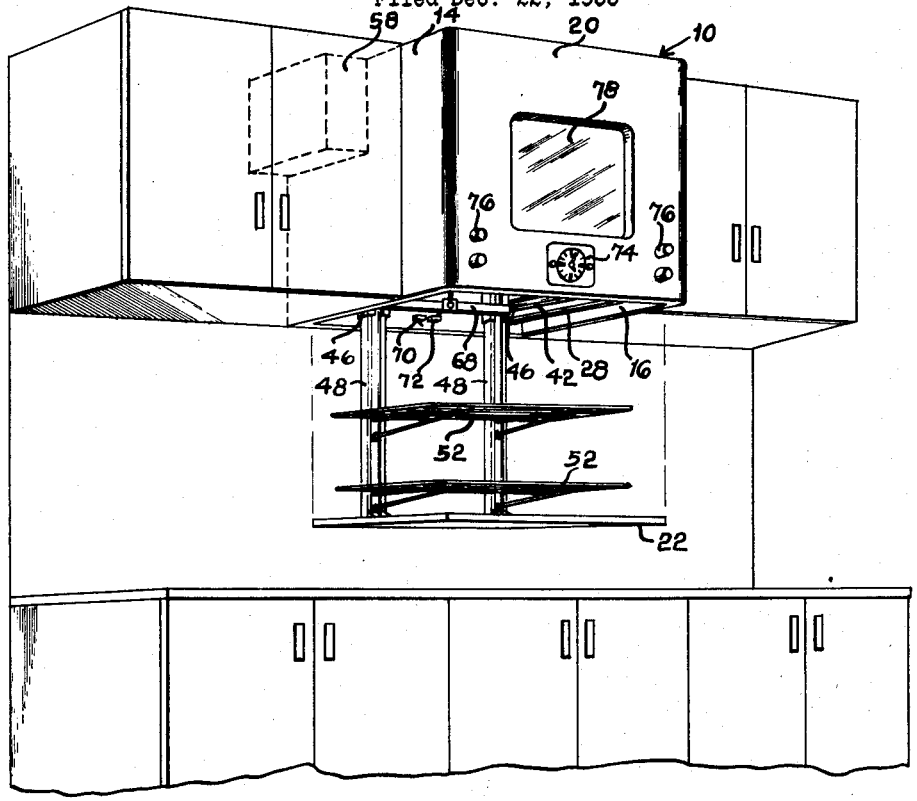
Figure 1 is a perspective view of the exterior of an oven for kitchen use, mounted between conventional kitchen cabinets.

Referring to the drawings in detail, the subject of this invention is an oven shown generally at 10 in Figure 1. The oven depicted is designed for installation in the kitchen of a home. However, the mechanical features described herein will also be applicable to other types of ovens, such as industrial drying and curing ovens.

The oven 10 is enclosed by six panels, an insulated top panel 12, two insulated side panels 14 and 16, an insulated back panel 18, an insulated front panel 20, and a door 22 closing the bottom of the oven. Within the oven 10 is an inner heating chamber 24 formed by a pair of insulated side partitions 26 and 28 and an insulated top partition 30. The partitions cooperate with the front panel 20, the back panel 18 and the door 22 to enclose the inner chamber 24.

The side partitions 26 and 28 are parallel to the side panels 14 and 16, there being an air space 32 between the side panel 14 and the side partition 26 and a corresponding air space 34 between the side panel 16 and the side partition 28. The air spaces 32 and 34 join with an air space 36 between the top panel 12 and the top partition 30 to form a U-shaped air channel partially surrounding the inner heating chamber 24.

Figures 2, 3:
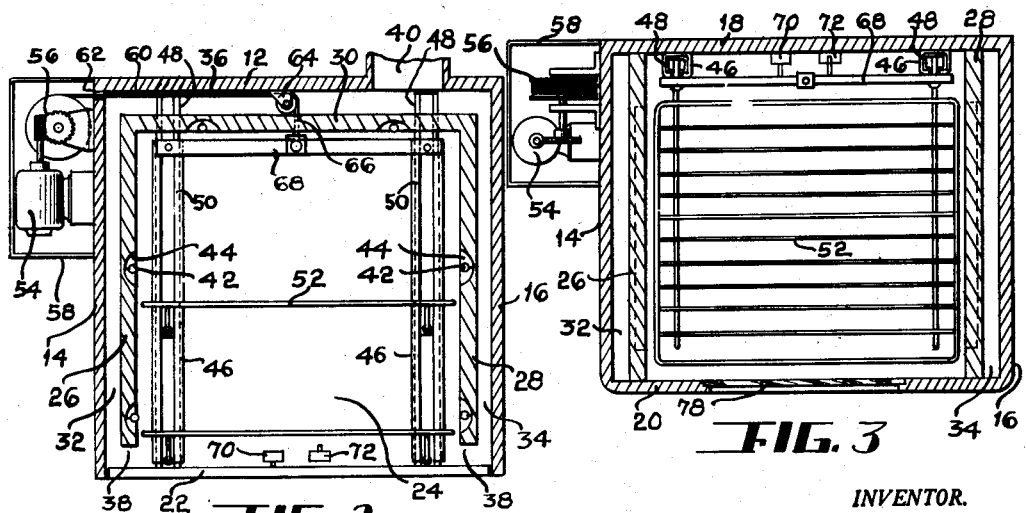
Figure 2 is a front elevational view of the oven with the front panel of the oven broken away to reveal the interior construction of the oven.
Figure 3 is a top plan view of the oven with the top panel of the oven broken away to reveal the interior construction of the oven.

An air gap 38 is provided between each side partition 26 and 28 and the door 22 at the bottom of the oven. Thus, a movement of air is permitted between the inner chamber 24 and the surrounding U-shaped air channel. The gaps 38 and the U-shaped air channel are best seen in Figure 2.

In the top panel 12 is a duct 40 which permits a movement of air from the U-shaped channel into an exhaust flue (not shown). Although not shown in the figures, a grease trap may be provided in the duct 40.

A plurality of heating elements 42 are provided on the inner surfaces of the partitions 26, 28 and 30. Electrical heating elements 42, backed by reflectors 44, are illustrated in the figures, however, any other suitable heat sources, such as gas gratings, may be substituted therefor.

When the heating elements 42 are energized, the air within the inner heating chamber 24 is heated. As the air is heated, the volume of the air increases and, as a result, the hotter air rises to the top of the chamber 24 and the cooler air within the chamber 24 is displaced toward the bottom of the chamber. The coolest air is forced out of the chamber 24 through the gaps 38 into the air spaces 32 and 34. This displaced air will be warmer than the air outside the chamber 24 and will, therefore, rise through the air spaces 32 and 34 into the air space 36 and, eventually, out of the oven 10 through the duct 40.

In traveling through the air spaces 32, 34 and 36, the air displaced from the chamber 24 will provide an envelope of relatively warm air partially surrounding the inner chamber 24, thereby reducing heat losses through the partitions 26, 28 and 30. The net effect is a very efficient utilization of the heat energy supplied by the heating elements 42.

There is no tendency for heated air to escape the inner chamber 24 through the door 22. Whether the door 22 is closed or not has little effect upon the oven temperature. Thus, the door 22 need not be insulated and may be opened at any time without appreciably affecting the temperature within the inner chamber 24, even though room air will circulate through the air spaces 32 and 34. The door 22 is not actually needed for retaining hot gases in the oven. It is provided in the present design primarily for the purpose of collecting drippings and the like from the contents of the oven and to give the oven a more conventional appearance.

The door 22 is attached to the oven 10 in the following manner. A pair of vertically extending channel members 46 are secured to the inner surface of the back panel 18. Complementary channel members 48, adapted to slide within the channel members 46, are attached to the rear portion of the door 22 and project normally therefrom. The channel members 48 may project upwards through the top partition 30, as shown in Figure 2. The inner channel members 48 are prevented from moving laterally out of the outer channel members 46 by inwardly directed flanges 50 integral with the outer channel members 46. The door 22 is free to slide upwardly to close the oven 10 and downwardly to open the oven 10.

A plurality of horizontal support racks 52 are attached to the inner channel members 48. Since the door 22 is also attached to the inner channel members 48, the racks 52 will move in and out of the oven 10 as the door 22 closes and opens. The vertical position of the racks 52 with respect to the door 22 is adjustable by sliding the racks within the channel members 48.

An electric motor 54, driving a winch 56, is provided for automatically opening and closing the door 22. The motor 54 and winch 56 are mounted, for convenience, on the outside of the side panel 14 and protected by a shield 58. Extending from the winch 56 is a cable 60 which passes through a small hole 62 in the panel 14, horizontally across the air space 36 to a centrally located pulley 64 suspended from the top panel 12, downwardly from the pulley 64 through a small hole 66 in the top partition 30, to engage the mid point of a cross bar 68. The ends of the cross bar 68 are joined to the two inner channel members 48. Thus, the cable 60 may be drawn in or let out by the winch 56 to close or open the door 22.

The open and closed positions of the door 22 are controlled by limit switches 70 and 72 located on the rear panel 18 of the oven 10. The switch 70 is actuated to stop the motor 54 by the door 22 in the closed position. The switch 72 is actuated to stop the motor 54 by the cross bar 68 when the door 22 is in the open position.

A timer 74 is provided for automatically energizing the motor 54. It will be apparent to any one skilled in the art that circuits may be devised whereby the timer 74 may be preset to close the door 22 and start the oven; or to heat the oven for a predetermined time, then open the door 22; and so on. For convenience the timer 74 is located on the front panel 20. Provision is also made for other controls 76 on the front panel 20. These controls may be temperature controls, manual door positioning controls, et cetera.

A window 78 for inspection of the contents of the oven 10 is provided in the front panel 20.

It is apparent from this description that the oven 10 would best be mounted in an elevated position where the operation of the motor 54 would be such that contents placed on the racks 52 would be lowered from the oven to a convenient working height where an operator could readily handle the contents. Also, when the contents are heated in the oven, the contents would be at a convenient height for inspection through the window 78.

The oven described herein has particular adaptability in industry. In many industrial ovens, the oven is charged with special gases, as nitrogen, for the purposes of accelerating or retarding a chemical reaction. With conventional ovens having side openings, these gases are lost to the atmosphere each time the oven is opened. With the oven of this invention, the special gases will be retained largely in the inner chamber 24, without loss of heat. This feature provides for repeated use of the oven containing special gases, without the time consuming operations of flushing and recharging the oven with the special gas. Only slight modifications in design are required to provide for a pressurized oven as sometimes required in industrial applications.

In some specialized applications, as in ceramic kilns, extremely delicate objects are to be placed in an oven and slowly taken up to high heat. The present oven is well adapted to this task, in that the motor speed can be adjusted to gradually raise or lower delicate objects into and out of the oven at any desired speed. By using a manual control, the contents may be advanced into the oven in any desired stepwise manner.

It is further unimportant whether the oven door and rack are advanced into the oven, as shown and described, or whether with modifications in design, the door and racks are maintained stationary and the oven housing is lowered over the racks. The movable housing may be preferable in some industrial assembly lines and in cases where extremely delicate objects are to be heated in the oven.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an oven having an open bottom, a plurality of partitions within said oven disposed so as to define as inner chamber with top and sides closed and with an open bottom, said partitions being separated from the walls of the oven so as to provide air spaces adjacent the inner chamber, a door movably attached to said oven for closing the bottom thereof, said door having a down position and an up position, the bottom of the oven being closed when the door is in the up position, there being an air gap between the inner chamber and the door whereby air may flow from the inner chamber into the adjacent air spaces, the top of said oven having a duct therein whereby air in the air spaces adjacent the inner chamber may flow out of the oven.

2. In an oven having an open bottom, a plurality of partitions within said oven disposed so as to define an inner chamber, said partitions being separated from the walls of the oven so as to provide air spaces adjacent the inner chamber, the top of said oven having a duct therein whereby air in the air spaces adjacent the inner chamber may flow out of the oven, a door, a support rack above said door, means for movably attaching the door and the support rack to the oven, the support rack being movable vertically into and out of the inner chamber, the door moving upwards to close the bottom of the oven as the support rack enters the inner chamber, the inner chamber being disposed above the door when the door is in the closed position so as to provide a gap between the inner chamber and door, the gap permitting air to move out of the inner chamber to the adjacent air spaces.

3. In an oven having an open bottom, a plurality of partitions within said oven disposed so as to define an inner chamber, said partitions being separated from the walls of the oven so as to provide air spaces adjacent the inner chamber, the top of said oven having a duct therein whereby air in the air spaces adjacent the inner chamber may flow out of the oven, a door, a support rack above said door, means for movably attaching the door and the support rack to the oven, the support rack being movable vertically into and out of the inner chamber, the door moving upwards to close the bottom of the oven as the support rack enters the inner chamber, the inner chamber being disposed above the door is in the closed position so as to provide a gap between the inner chamber and the door, the gap permitting air to move out of the inner chamber to the adjacent air spaces, and means for moving the door and support rack in a vertical direction.

4. In an oven having an open bottom, a plurality of partitions within said oven disposed so as to define an inner chamber, said partitions being separated from the walls of the oven so as to provide air spaces adjacent the inner chamber, the top of said oven having a duct therein whereby air in the air spaces adjacent the inner chamber may flow out of the oven, a door, a support rack above said door, means for movably attaching the door and the support rack to the oven, the support rack being movable vertically into and out of the inner chamber, the door moving upwards to close the bottom of the oven as the support rack enters the inner chamber, the inner chamber being disposed above the door when the door is in the closed position so as to provide a gap between the inner chamber and the door, the gap permitting air to move out of the inner chamber to the adjacent air spaces, motor means for moving the door and the support rack in a vertical direction, and limit switches attached to said oven for regulating the operation of the motor means, said switches determining an open door position and a closed door position.

5. In a combination, an oven having an open bottom, a door for closing the bottom of said oven, means defining an inner heating chamber within said oven, said inner heating chamber having a closed top, closed sides and an open bottom opposite said door, a heating element disposed in said inner heating chamber, means providing an air space between the side walls of said inner heating chamber and the side walls of said oven, means providing an exhaust duct in the top of said oven communicating with said air space, and means providing an air passage adjacent the bottom of said inner heating chamber connecting the inner heating chamber with said air space.

References Cited in the file of this patent

UNITED STATES PATENTS

| | | |
|---|---|---|
| 929,089 | Hellmig | July 27, 1909 |
| 1,534,592 | Houck | Apr. 21, 1925 |
| 1,636,041 | Breaker | July 19, 1927 |
| 1,998,343 | Teller et al. | Apr. 16, 1935 |
| 2,003,059 | Teller et al. | May 28, 1935 |
| 2,019,599 | Driggs | Nov. 5, 1935 |
| 2,133,639 | Smith et al. | Oct. 18, 1938 |
| 2,341,766 | Fox | Feb. 15, 1944 |
| 2,382,354 | Wales | Aug. 14, 1945 |
| 2,383,203 | Lee | Aug. 21, 1945 |
| 2,429,523 | Murphy | Oct. 21, 1947 |

FOREIGN PATENTS

| | | |
|---|---|---|
| 790,444 | France | Sept. 9, 1935 |
| 452,212 | Great Britain | Aug. 18, 1936 |

UNITED STATES PATENT OFFICE

CERTIFICATE OF CORRECTION

Patent No. 2,944,540                                     July 12, 1960

Charles C. Littell, Jr.

It is hereby certified that error appears in the printed specification of the above numbered patent requiring correction and that the said Letters Patent should read as corrected below.

Column 3, line 49, for "plcaed" read -- placed --; column 4, line 19, for "define as" read -- define an --; line 46, after "and" insert -- the --; line 61, after "door" insert -- when the door --.

Signed and sealed this 27th day of December 1960.

(SEAL)
Attest:

KARL H. AXLINE
Attesting Officer

ROBERT C. WATSON
Commissioner of Patents